United States Patent
Henion

(10) Patent No.: US 7,572,020 B2
(45) Date of Patent: Aug. 11, 2009

(54) MIRROR RETENTION SYSTEM

(75) Inventor: Paul R. Henion, Port Huron, MI (US)

(73) Assignee: Visiocorp Patents S.a.r.l, Luxembourg (LU)

( * ) Notice: Subject to any disclaimer, the term of this patent is extended or adjusted under 35 U.S.C. 154(b) by 205 days.

(21) Appl. No.: 10/588,326

(22) PCT Filed: Feb. 4, 2005

(86) PCT No.: PCT/US2005/003643

§ 371 (c)(1),
(2), (4) Date: Aug. 3, 2006

(87) PCT Pub. No.: WO2005/076932

PCT Pub. Date: Aug. 25, 2005

(65) Prior Publication Data

US 2007/0177286 A1    Aug. 2, 2007

Related U.S. Application Data

(60) Provisional application No. 60/542,161, filed on Feb. 5, 2004.

(51) Int. Cl.
*G02B 7/182* (2006.01)
*A47G 1/24* (2006.01)
*B60R 1/02* (2006.01)

(52) U.S. Cl. ...................... 359/876; 248/481
(58) Field of Classification Search ............... 359/871, 359/872, 876; 248/476–479, 481, 483
See application file for complete search history.

(56) References Cited

U.S. PATENT DOCUMENTS

| 5,363,246 | A | 11/1994 | Perry et al. |
| 6,511,192 | B1 | 1/2003 | Henion et al. |
| 6,609,800 | B2 | 8/2003 | Assinder et al. |

*Primary Examiner*—Alessandro Amari
(74) *Attorney, Agent, or Firm*—Reising Ethington P.C.

(57) ABSTRACT

A vehicle side mirror (10) that includes an internal case frame (30) having a spherical concave support portion (38) and a 'T shaped' retention post (40). The spotter mirror (28) also includes a backing plate (54) having a dish portion (56) with a center opening (58). The backing plate (54) is positioned against the case frame (30) so that the support portion and the dish portion (56) cooperate and the retention post (40) extends through the opening (58) in the dish portion (56). The spotter mirror (28) further includes a single piece retention ring (66) having ramped cam surfaces (72, 74) and leaf springs (78). The retention ring (66) is positioned within the dish portion (56) so that the retention post (40) extends through a center slot (58) in the ring (66). The retention ring (66) is rotated so that ramped cam surfaces (72, 74) push against a back surface of the post (40). The pointing direction of the glass (86) can be manually adjusted by rotating the dish portion (56) on the support portion (30).

19 Claims, 7 Drawing Sheets

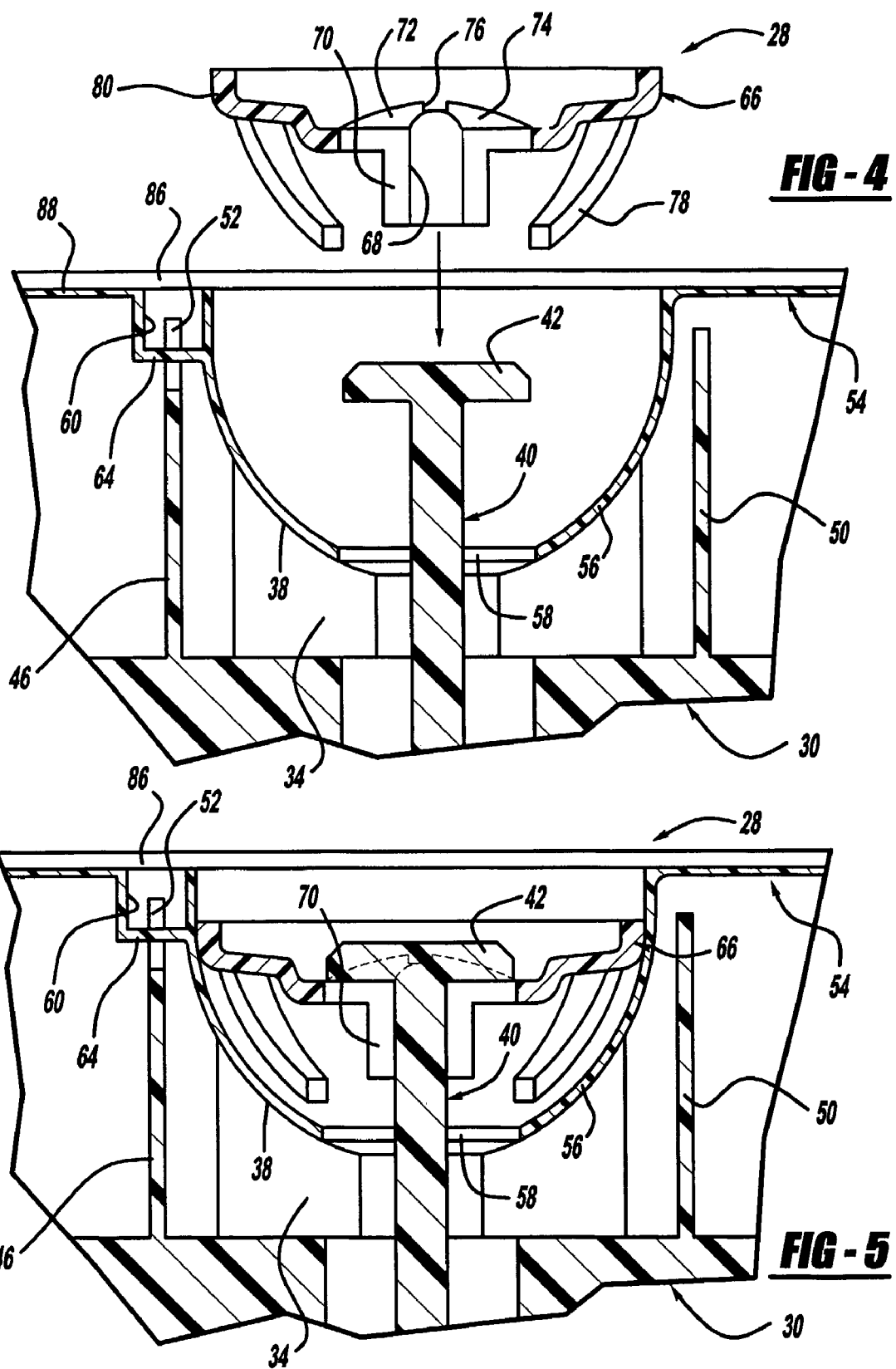

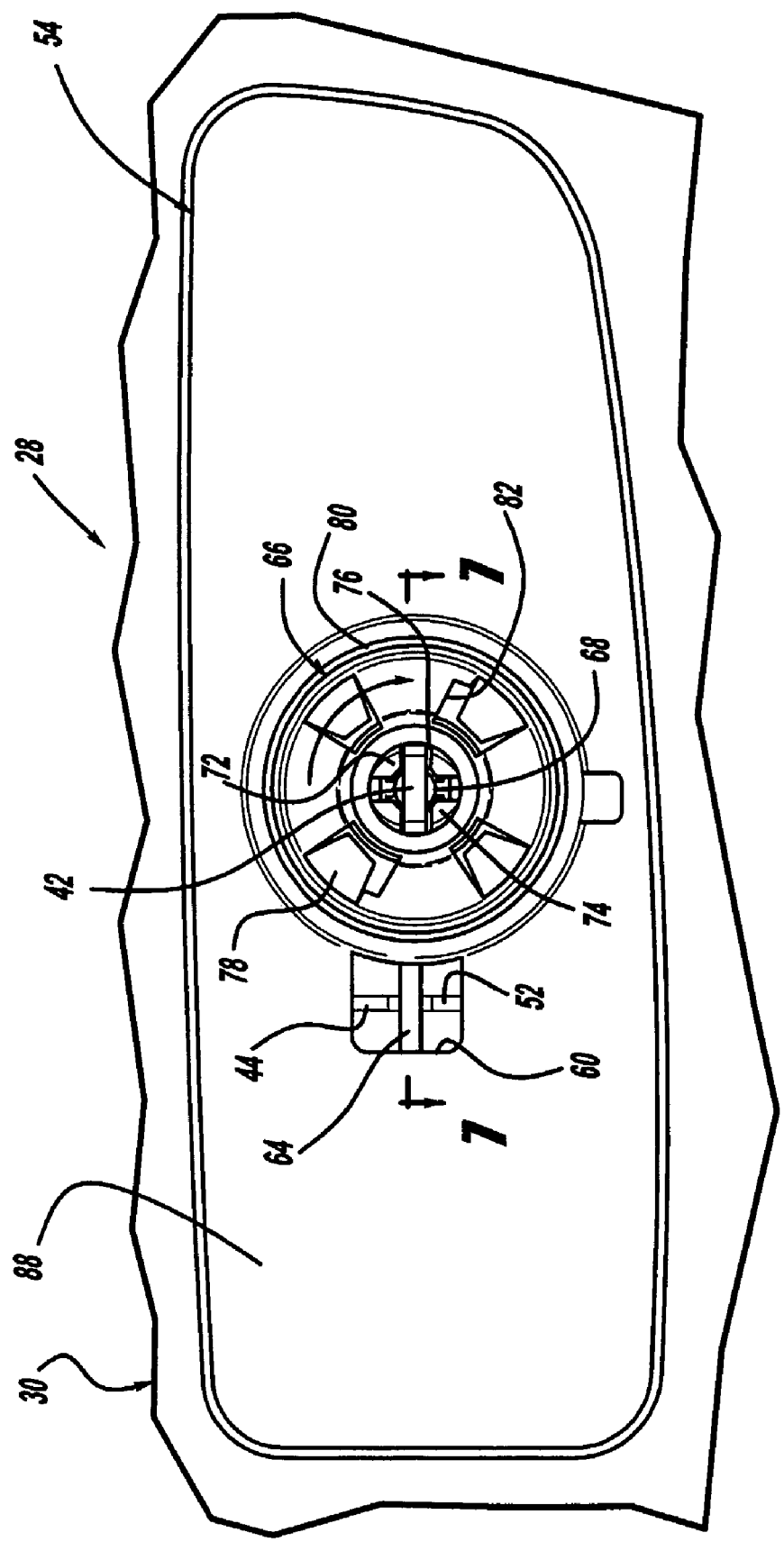

US 7,572,020 B2

MIRROR RETENTION SYSTEM

CROSS-REFERENCE TO RELATED APPLICATIONS

This application is a National Stage of International Application No. PCT/US05/003643, filed Feb. 4, 2005, which claims the benefit of U.S. Provisional Patent Application No. 60/542,161 filed on Feb. 5, 2004. The disclosures of the above applications are incorporated herein by reference.

BACKGROUND OF THE INVENTION

1. Field of the Invention

This invention relates generally to a positioning mechanism for a side mirror of a vehicle and, more particularly, to a positioning assembly including a single piece plastic retention ring for manually positioning a spotter mirror associated with a vehicle side mirror assembly.

2. Discussion of the Related Art

Vehicles employ side mirrors that allow the vehicle operator to see behind and to the side of the vehicle. State of the art side mirrors are sometimes elaborate assemblies that include various options and features that increase the operator's ability to see objects, more safely operate the vehicle, provide a more aesthetically pleasing appearance, etc. In one known vehicle side mirror design, the side mirror assembly includes an upper normal viewing mirror and a lower spotter mirror providing a narrower field of view. It is known in the art to provide various mechanisms and devices to manually adjust the spotter mirror so that it is pointed in the proper direction for a particular vehicle operator. These known devices and mechanisms typically include multiple parts, including metal pieces, that need to be assembled together to provide the positioning operation. Further, the known positioning devices cannot be taken apart to be serviced. It is desirable to reduce the number of parts in a vehicle side spotter mirror to reduce assembly time, complexity, cost, weight, etc., and allow the mirror to be serviceable.

SUMMARY OF THE INVENTION

In accordance with the teachings of the present invention, a vehicle rearview side mirror is disclosed that employs a spotter mirror assembly including a positioning mechanism for directing the mirror. The side mirror includes an internal case frame having a spherical concave support portion and a "T-shaped" retention post extending from a center area of the support portion. The spotter mirror assembly includes a backing plate having an extended dish portion with a center opening. The backing plate is positioned against the case frame so that the support portion and the dish portion nest together and the post extends through the opening in the dish portion. The spotter mirror assembly further includes a single piece plastic retention ring having a cam locking portion and leaf springs. The retention ring is positioned within the dish portion so that the retention post extends through a center slot in the ring.

The retention ring is rotated so that ramped cam surfaces of the cam locking portion push against a back surface of the tip of the post. The ramped surfaces force the leaf springs against the inside surface of the dish portion. The tip of the post is locked in a détente position to rigidly secure the backing plate to the case frame. A spotter mirror glass is mounted to the backing plate. The backing plate and glass can be manually adjusted by rotating the dish portion on the support portion to adjust the viewing direction of the mirror glass.

Additional advantages and features of the present invention will become apparent from the following description and appended claims, taken in conjunction with the accompanying drawings.

BRIEF DESCRIPTION OF THE DRAWINGS

FIG. 4 is an exploded cross-sectional view showing a retention ring of the spotter mirror assembly of the invention;

FIG. 5 is a cross-sectional view of the spotter mirror assembly through line 5-5 in FIG. 3;

FIG. 6 is a front view of the spotter mirror assembly of the invention with the mirror glass removed showing the cam locking feature of the retention ring;

DETAILED DISCUSSION OF THE EMBODIMENTS

The following discussion of the embodiments of the invention directed to a positioning mechanism for a spotter mirror assembly is merely exemplary in nature, and is in no way intended to limit the invention or its applications or uses.

Figure 1:
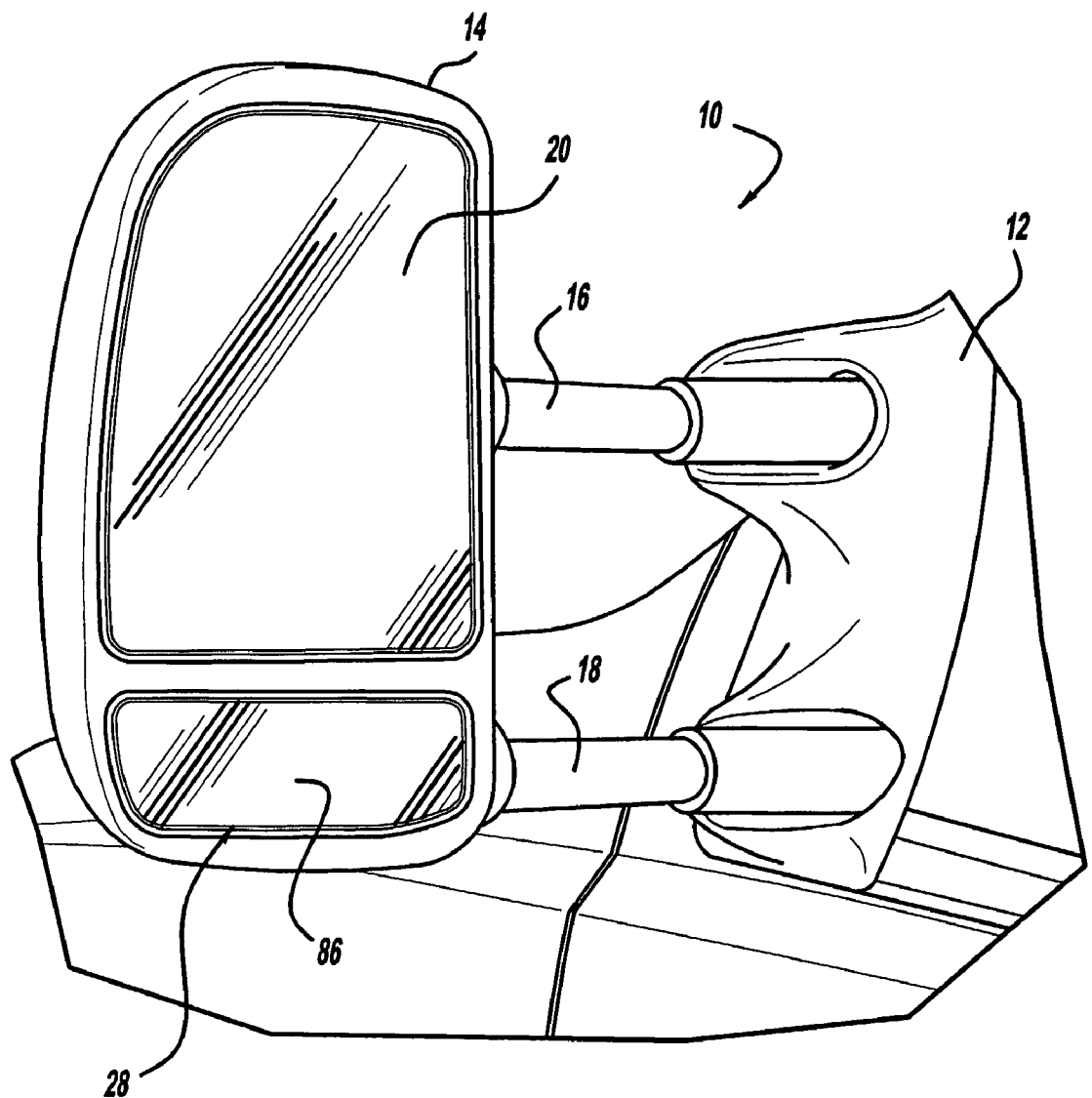
FIG. 1 is a perspective view of a vehicle side mirror assembly including a spotter mirror assembly, according to an embodiment of the present invention.

FIG. 1 is a perspective view of a vehicle side mirror assembly 10 mounted to the side of a vehicle 12. The side mirror assembly 10 includes a mirror housing 14 mounted to the vehicle 12 by mounting rods 16 and 18. The housing 14 can be mounted to the rods 16 and 18, and the rods 16 and 18 can be mounted to the vehicle 12 by any suitable technique that is applicable for a particular design. For example, the side mirror assembly 10 can include mechanisms to allow the assembly 10 to be folded, both forward and backward, and the housing 14 can be moved in and out on telescoping mechanisms associated with the rods 16 and 18. The side mirror assembly 10 includes a normal viewing side mirror glass 20 that can be positioned for directional viewing purposes electrically or manually, as is well known in the art.

According to the invention, the side mirror assembly 10 includes a spotter mirror assembly 28 positioned below the normal viewing mirror glass 20, as shown. The discussion below of the spotter mirror assembly 28 is not limited to a spotter mirror for a vehicle side mirror, or a spotter mirror in combination with another mirror. The features of the spotter mirror assembly 28 of the invention have application for directing any suitable mirror. Further, as will become apparent from the discussion below, the features of the spotter mirror assembly 28 of the invention allow the assembly 28 to be taken apart for servicing.

Figure 2:
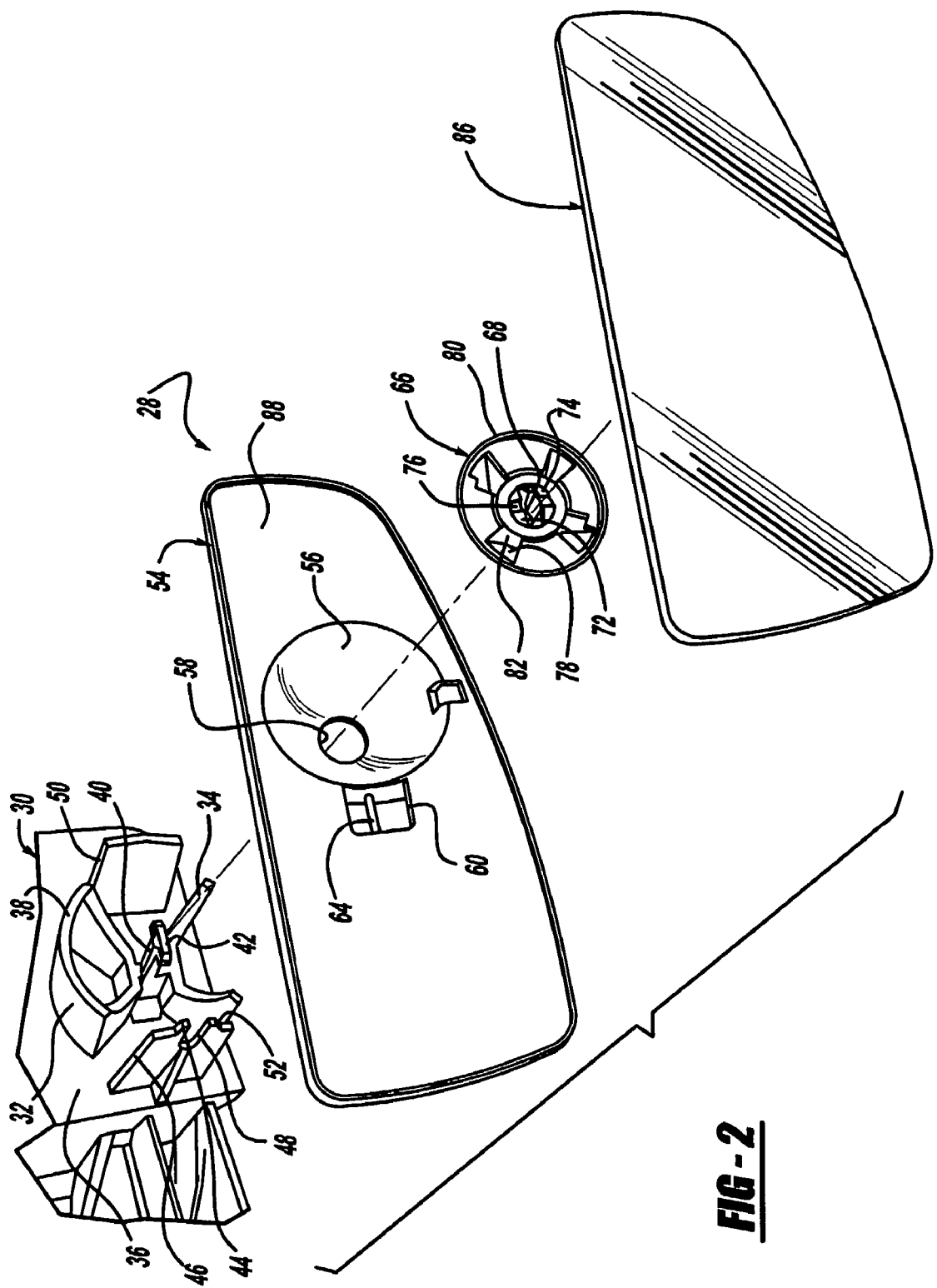
FIG. 2 is an exploded perspective view of the spotter mirror assembly of the side mirror assembly shown in FIG. 1.

FIG. 2 is an exploded perspective view of the side mirror assembly 28. The side mirror assembly 10 includes an internal support case frame 30 positioned with the housing 14 that is molded of a suitable plastic material. The case frame 30 includes extended members 32 and 34 extending from a base plate 36 that are molded with the case frame 30 and define a spherical concave surface 38. A retention post 40 is mounted to the base plate 36 between the members 32 and 34 at a center location of the spherical surface 38. The post 40 includes an elongated tip 42 so that the post 40 has a "T" shape.

The case frame 30 also includes a first spacing member 46 extending from the base plate 36 at one side of the post 40, as shown. The spacing member 46 includes a U-shaped slot 48 defining end tips 44 and 52. The case frame 30 also includes a second spacing member 50 extending from the base plate 36 at an opposite side of the post 40 from the first spacing member 46.

The spotter mirror assembly 28 includes a backing plate 54 having an extended spherical dish portion 56. A circular opening 58 is provided at the center of the dish portion 56. The backing plate 54 also includes a rectangular opening 60 adjacent to the dish portion 56. An aligning bar 64 extends across the opening 60 and is mounted to the dish portion 56, as shown. The backing plate 54 is a single piece molded structure made of a suitable plastic material. An outer mirror glass 86 is positioned over a front of the spotter mirror assembly 28 and can be mounted to a rearward facing surface 88 of the backing plate 54 by double-sided tape or the like.

The spotter mirror assembly 28 also includes a retention ring 66 having a center slot 68 defined by an extended neck portion 70 (FIG. 4). In one embodiment, the retention ring 66 is a single piece molded plastic member. The retention ring 66 includes opposing ramps 72 and 74 positioned around the slot 68 to provide a cam locking feature as will become apparent from the discussion below. The ramps 72 and 74 define an elongated détente position 76 extending across the slot 68. The retention ring 66 also includes a plurality of symmetrically disposed leaf springs 78 (FIG. 4), four in this embodiment, extending from an outer rim 80 of the ring 66 towards the backing plate 54. The retention ring 66 also includes a plurality of symmetrically disposed and specially configured openings 82 that accept a tool (not shown) to rotate the retention ring 66 for reasons that will become apparent from the discussion below.

Figure 3:
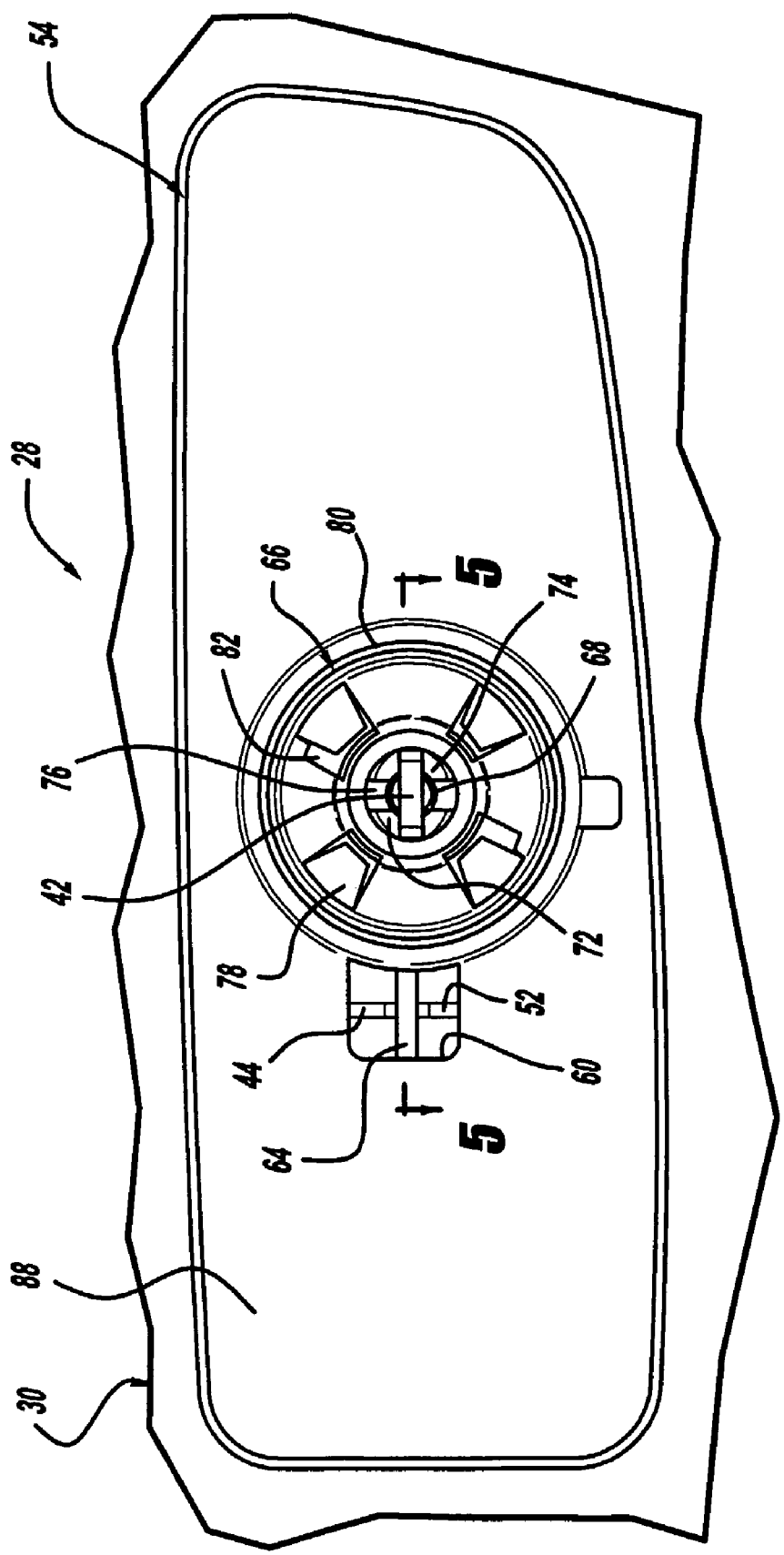
FIG. 3 is a front view of the spotter mirror assembly of the invention with the mirror glass removed.

FIG. 3 is a front view of the spotter mirror assembly 28 with the mirror glass 86 removed. In this view, the retention ring 66 is in an un-locked orientation. During assembly, the backing plate 54 is positioned against the case frame 30 so that the post 40 extends through the opening 58, and the dish portion 56 nests with the surface 38 defined by the members 32 and 34. The tips 44 and 52 of the spacing member 46 extend into the opening 60 so that the alignment rod 64 is positioned within the slot 48. FIG. 4 is a cross-sectional view showing this step of the assembly process where the backing plate 54 is positioned against the case frame 30. The retention ring 66 secures the backing plate 54 to the case frame 30. The retention ring 66 is oriented relative to the post 40 so that the tip 42 of the post 40 is able to slide through the neck portion 70 within the slot 68. FIG. 5 is a cross-sectional view of the retention ring 66 positioned within the dish portion 56 in this orientation.

Figure 7:
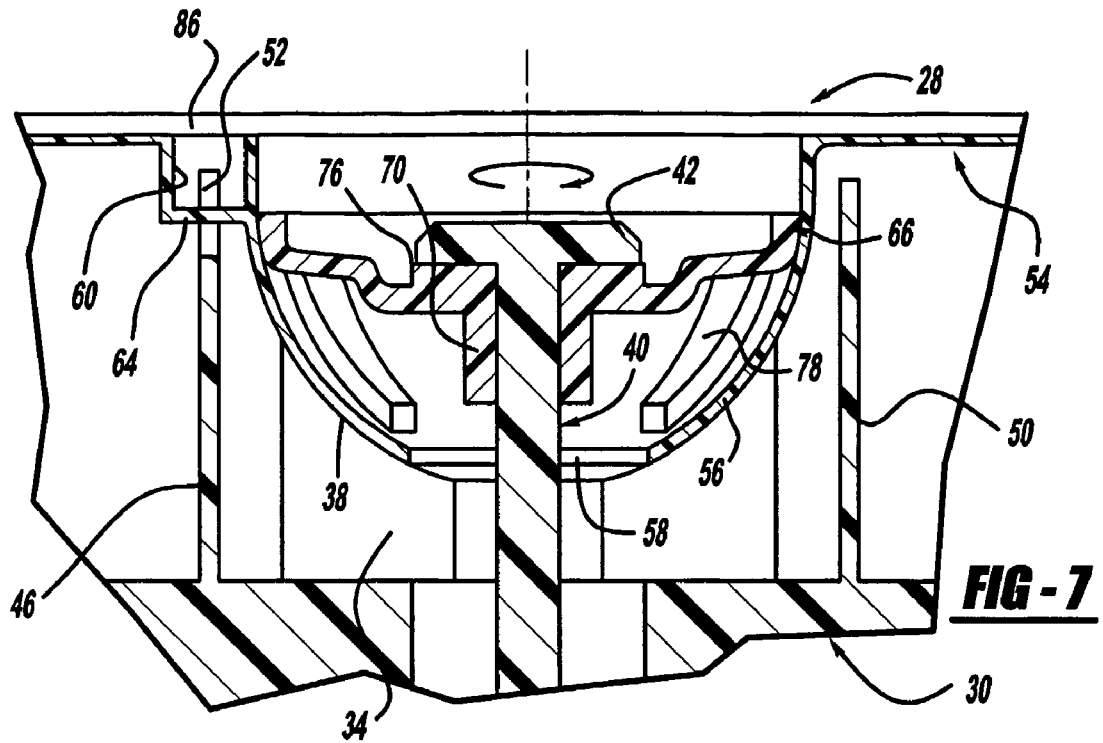
FIG. 7 is a cross-sectional view of the spotter mirror assembly of the invention through line 7-7 in FIG. 6.

The retention ring 66 is then rotated 90° clockwise by the tool so that the cam ramps 72 and 74 push against a bottom surface of the tip 42 and force the springs 78 and the rim 80 against the dish portion 56. As the retention ring 66 is rotated, the backing plate 54 is tightly positioned against the case frame 30, and the tip 42 is locked within the détente position 76. FIG. 6 is a front view of the spotter mirror assembly 28 with the mirror glass 86 removed and the retention ring 66 in the locked position. FIG. 7 is a cross-sectional view through line 7-7 of FIG. 6 of the spotter mirror assembly 28 showing the retention spring 66 in the locked position. The spotter mirror assembly 28 can also be disassembled by rotating the retention ring 66 90° in the counter-clockwise direction.

The configuration of the retention ring 66 and the backing plate 54 allows the backing plate 54 and mirror glass 86 to be pivoted relative to the case frame 30 to position the viewing direction of the mirror glass 86. Particularly, by applying manual force to a particular location on the mirror glass 86, the dish portion 56 is able to pivot relative to the surface 38 in two-degrees of freedom. The pressure applied by the leaf springs 78 and the rim 80 to the dish portion 56 holds the backing plate 54 to maintain its position once it is moved. The extended neck portion 70 helps maintain the retention ring 66 at a fixed position relative to the case frame 30 because it is axially aligned with the post 40.

Figure 8:
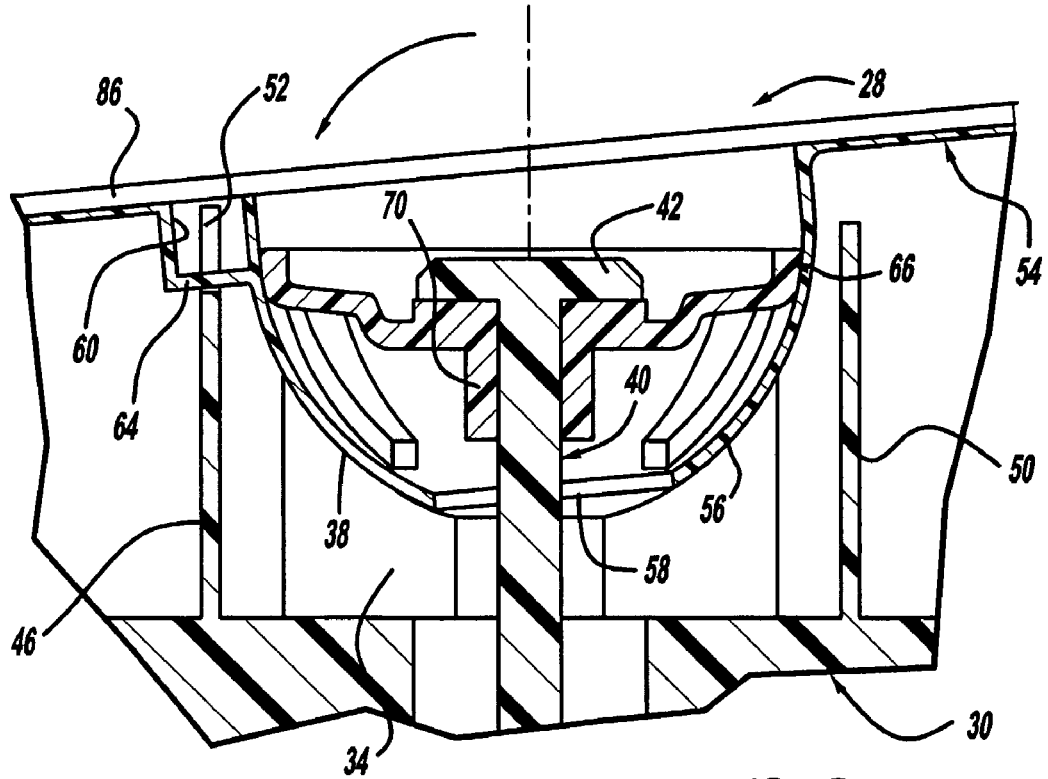
FIGS. 8 and 9 are cross-sectional views of the spotter mirror assembly of the invention showing adjustment positions of the mirror assembly.
Figure 9:
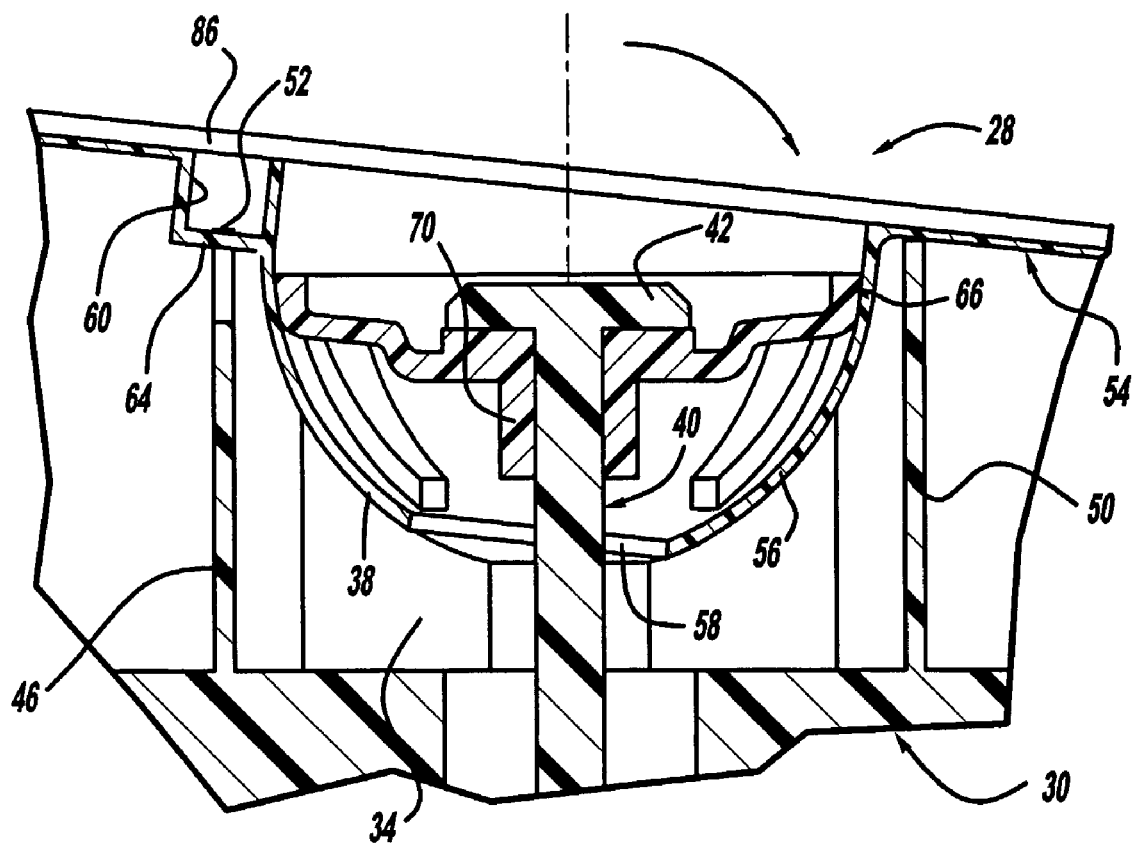

FIG. 8 is a cross-sectional view of the spotter mirror assembly 28 showing the backing plate 54 positioned in one orientation and FIG. 9 is a cross-sectional view of the spotter mirror assembly 28 showing the backing plate 54 in an opposite orientation. The spacing members 46 and 50 define the range of travel of the backing plate 54 in a left-right direction, and the size of the opening 58 define the range of travel of the backing plate 54 relative to the post 40 in an up-down direction.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A mirror assembly comprising:
a case frame (30) defining a concave surface (38), said case frame (30) including a retention post (40) having an elongated tip (42) in a T-shape with respect to said retention post (40); a backing plate (54) including a support surface (88) and a dish portion (56) having a center opening (58), said backing plate (54) being positioned against the case frame (30) so that the dish portion (56) cooperates with the concave surface (38) and the post (40) extends through the center opening (58) in the dish portion (56);
a retention ring (66), said retention ring (66) including a center slot (68) and a locking portion (72), (74), (76), said retention post (40) extending through the center slot (68) so that the tip of the post (40) is engaged with the locking portion (72), (74), (76); and
a mirror glass (86) mounted to the support surface (88) of the backing plate (54), wherein the backing plate and the mirror glass (86) can be manually positioned by pivoting the dish portion (56) on the concave surface (38).

2. A mirror assembly comprising:
a case frame (30) defining a concave surface (38), said case frame (30) including a retention post (40) having an elongated tip (42); a backing plate (54) including a support surface (88) and a dish portion (56) having a center opening (58), said backing plate (54) being positioned against the case frame (30) so that the dish portion (56) cooperates with the concave surface (38) and the post (40) extends through the center opening (58) in the dish portion (56);
a retention ring (66), said retention ring (66) including a center slot (68) and a locking portion (72), (74), (76), said retention post (40) extending through the center slot (68) so that the tip of the post (40) is engaged with the locking portion (72), (74), (76); and
a mirror glass (86) mounted to the support surface (88) of the backing plate (54), wherein the backing plate and the mirror glass (86) can be manually positioned by pivoting the dish portion (56) on the concave surface (38);

wherein the locking portion (72), (74), (76) includes opposing cam ramps (72), (74) and a detent (76) that accepts the elongated tip (42), wherein the retention ring (66) is secured to the mirror assembly (10) by inserting the retention post (40) through the slot (68), rotating the retention ring (66) so that the tip rides along the ramps (72), (74) until the tip is positioned in the detent (76).

3. The mirror assembly according to claim 2 wherein the retention ring (66) further includes at least one spring element (78), said at least one spring element (78) applying pressure against the dish portion (56) when the retention ring (66) is locked to the backing plate (54).

4. The mirror assembly according to claim 3 wherein the at least one spring element (78) is four symmetrically disposed leaf spring elements (78) extending from a rim (80) of the retention ring (66).

5. The mirror assembly according to claim 2 wherein the retention ring (66) further includes an extended neck portion (70), said retention post (40) extending through the neck portion (70).

6. The mirror assembly according to claim 2 wherein the retention ring (66) is a single piece plastic member.

7. The mirror assembly according to claim 2 wherein the case frame (30) includes at least one spacing member (46) having a slot (48) and the backing plate (54) includes an opening (60) and an alignment arm (64) extending across the opening (60), and wherein the alignment arm (64) is positioned within the slot (48) of the spacing member (46).

8. The mirror assembly according to claim 2 wherein the concave surface (38) of the case frame (30) is defined by members (32), (34), (46), (50) extending from the case frame (30).

9. The mirror assembly according to claim 2 wherein the retention ring (66) includes a plurality of openings (82) for accepting a tool to rotate the ring (66) within the dish position (56).

10. The mirror assembly according to claim 2 wherein the case frame (30) is an internal support structure of a side mirror of a vehicle (12).

11. The mirror assembly according to claim 10 wherein the mirror assembly (10) is a spotter mirror assembly associated with the side mirror.

12. A vehicle side spot mirror assembly comprising:
an internal case frame (30) including members defining a concave surface (38), said case frame (30) further including a T-shaped retention post (40) having an elongated tip (42);
a backing plate (54) including a support surface (88) and a dish portion (56) having a center opening (58), said backing plate (54) being positioned against the case frame (30) so that the dish portion (56) cooperates with the concave surface (38) and the post (40) extends through the center opening (58) in the dish portion (56);
a single piece plastic retention ring (66), said retention ring (66) including a center slot (68), a plurality of symmetrically disposed spring elements (78), a neck portion (70) and a cam locking system (72), (74), (76) including opposing cam ramps (72), (74) and a detent (76) that accepts the elongated tip (42), said retention post (40) extending through the neck portion (70) and the center slot (68) so that the tip (42) of the post (40) is engaged with the locking system (72), (74), (76) and the spring elements (78) apply pressure against the dish portion (56), wherein the retention ring (66) is secured to the mirror assembly by inserting the retention post (40) through the center slot (68), rotating the retention ring (66) so that the tip (42) rides along the ramps (72), (74) until the tip (42) is locked in the détente (76); and
a mirror glass (86) mounted to the support surface (88) of the backing plate (54), wherein the backing plate (54) and the mirror glass (86) can be manually positioned by pivoting the dish portion (56) on the concave surface.

13. The mirror assembly according to claim 12 wherein the case frame (30) includes at least one spacing member (46) having a slot (48) and the backing plate (54) includes an opening (60) having an alignment arm (64) extending across the opening (60), and wherein the alignment arm (64) is positioned within the slot (48).

14. The mirror assembly according to claim 12 wherein the retention ring (66) includes a plurality of openings (82) for accepting a tool to rotate the ring (66) within the dish portion (56).

15. A method of directing a mirror, said method comprising:
providing a case frame (30) including a concave surface (38) and a retention post (66) having an elongated tip (42);
providing a backing plate (54) including a support surface (88) and a dish portion (56) having a center opening (58);
positioning the backing plate (54) against the case frame (30) so that the dish portion (56) cooperates with the concave surface and the post (40) extends through the opening (58) in the dish portion (56);
providing a retention ring (66) including a center slot (68), at least one spring element (78) and a locking portion (72), (74), (76);
positioning the retention ring (66) so that the retention post (40) extends through the center slot (68);
rotating the retention ring (66) so that the tip (42) of the post (40) engages the locking portion (72), (74), (76) and the at least one spring element (78) applies pressure against the dish portion (56);
mounting a mirror glass (86) to the support surface (88) of the backing plate (54);
adjusting the position of the backing plate (54) and the mirror glass (86) by pivoting the dish portion (56) on the concave surface (38).

16. The method according to claim 15 wherein providing a retention ring (66) includes providing opposing cam ramps (72), (74) and a detent (76) that accepts the elongated tip (42).

17. The method according to claim 15 wherein providing a retention ring (66) includes providing four symmetrically disposed spring elements (78) extending from a rim (80) of the retention ring (66).

18. The mirror assembly according to claim 15 wherein providing a retention ring (66) includes providing a single piece plastic member.

19. The mirror assembly according to claim 15 wherein providing a case frame (30) includes providing a case frame (30) having at least one spacing member (46) with a slot (48) and providing a backing plate (54) includes providing a backing plate (54) having an opening (60) with an alignment arm (64) extending across the opening (60), said method further comprising positioning the alignment arm (64) within the slot (48).

* * * * *

UNITED STATES PATENT AND TRADEMARK OFFICE
CERTIFICATE OF CORRECTION

PATENT NO. : 7,572,020 B2  Page 1 of 1
APPLICATION NO. : 10/588326
DATED : August 11, 2009
INVENTOR(S) : Paul R. Henion It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 213 days.

Signed and Sealed this

Fourteenth Day of December, 2010

David J. Kappos
*Director of the United States Patent and Trademark Office*